United States Patent [19]

Izumida et al.

[11] Patent Number: 4,834,458

[45] Date of Patent: May 30, 1989

[54] SEAT CUSHION STRUCTURE

[75] Inventors: Satoshi Izumida; Katsumi Kitamura; Masaru Kurita; Yasuo Tanaka, all of Kanagawa, Japan

[73] Assignee: Ikeda Bussan Co., Ltd., Ayase, Japan

[21] Appl. No.: 204,857

[22] Filed: Jun. 10, 1988

[30] Foreign Application Priority Data

Sep. 29, 1987 [JP] Japan .................. 62-244917

[51] Int. Cl.[4] .................................. A47C 7/02
[52] U.S. Cl. .................. 297/459; 297/452; 297/DIG. 3
[58] Field of Search ............. 297/DIG. 3, 284, 459, 297/458, 452

[56] References Cited

U.S. PATENT DOCUMENTS 4,671,570 6/1987 Hockenberry ............. 297/459 X
4,726,624 2/1988 Jay ............................ 297/DIG. 1

FOREIGN PATENT DOCUMENTS 1753810 10/1973 Fed. Rep. of Germany ...... 297/458
1251272 12/1960 France ............................ 297/459
7809666 3/1979 Netherlands ............... 297/DIG. 1

Primary Examiner—James T. McCall
Attorney, Agent, or Firm—Foley & Lardner, Schwartz, Jeffery, Schwaab, Mack, Blumenthal & Evans

[57] ABSTRACT

A seat cushion is disclosed which comprises a rectangularly extending frame having opposed side portions; a flat sheet member arranged within a space defined by the rectangular frame; connecting devices for connecting each side portion of the flat sheet member to one of the opposed side portions of the frame; a plastic panel member having side portions raised, the plastic member being disposed on the flat sheet member leaving between each of the raised side portions and corresponding one of the opposed side portions of the frame a generally wedge-shaped clearance; a cushion structure tightly mounted on the plastic panel in such a manner that side portions of the cushion structure are raised by the raised side portions of the plastic panel; and two cushion pad units respectively received in the wedge-shaped clearances defined below the raised side portions of the plastic panel member.

15 Claims, 3 Drawing Sheets

SEAT CUSHION STRUCTURE

BACKGROUND OF THE INVENTION

1. Field of the Invention

The present invention relates in general to a seat for a motor vehicle, and more particularly to a seat cushion of the seat which has spaced side portions raised for providing a seat occupant with a comfortable sitting posture.

2. Description of the Prior Art

Hitherto, various types of automotive seats have been proposed and put into practical use for the purpose of providing a seat occupant with a comfortable and stable sitting posture. In particular, various measures have been applied to the seat to lighten the fatique of the seat occupant when he or she is sitting on the seat for a long time. One of the measures is to provide a seat cushion with largely raised side portions of pad material.

The seat cushion of this type comprises a rectangular frame, a plate member held by and extending within the frame, a plastic panel seated on the plate member, a cushion pad entirely mounted on both the frame and the plastic panel, and an outer layer member covering the cushion pad. For formation of the raised side portions on the seat cushion, the plastic panel is molded to have raised or swelled side portions, and the amount of pad material put on such raised portions is somewhat increased.

However, due to its inherency in construction, the above-mentioned seat cushion has such the following drawbacks.

That is, for providing the raised side portions with a desired pliability, a greater amount of pad material must be put into given portions, by manual labor, where the raised side portions are to be provided. This may cause unbalanced configulations and sizes of the raised side portions. This further induces highly costed production of the seat. Furthermore, putting the pad material into the given portions requires the employment of skilled labor and time. Furthermore, the seat cushion of this type is forced to produce unsightly creases or wrinkles on the outer layer member when bearing a seat occupant.

SUMMARY OF THE INVENTION

It is therefore an object of the present invention to provide a seat cushion which is free of the above-mentioned drawbacks.

According to the present invention, there is provided a seat cushion which comprises a rectangularly extending frame having opposed side portions; a flat sheet member arranged within a space defined by the rectangular frame; connecting means for connecting each side portion of the flat sheet member to one of the opposed side portions of the frame; a plastic panel member having side portions raised, the plastic member being disposed on the flat sheet member leaving between each of the raised side portions and corresponding one of the opposed side portions of the frame a generally wedge-shaped clearance; a cushion structure tightly mounted on the plastic panel in such a manner that side portions of the cushion structure are raised by the raised side portions of the plastic panel; and two cushion pad units respectively received in the wedge-shaped clearances defined below the raised side portions of the plastic panel member.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
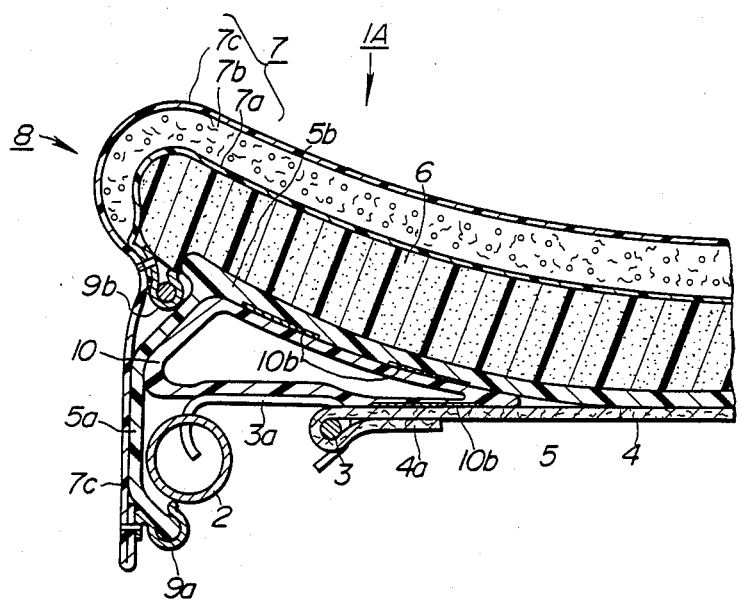
FIG. 1 is a partial sectional view of a seat cushion of a first embodiment of the present invention, which view is taken from a direction perpendicular to a longitudinal axis of the seat cushion.
Figure 2:
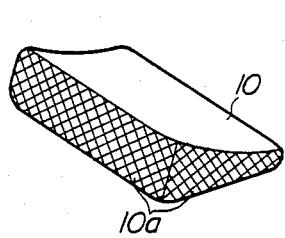
FIG. 2 is a perspective view of an air bag employed in the first embodiment.

Referring to FIGS. 1 and 2, particularly FIG. 1, there is shown but partially a seat cushion 1A of a first embodiment of the present invention.

The seat cushion 1 comprises a rectangularly extending frame 2 which is constructed of a metal pipe. A rectangular flexible sheet 4 extends within the rectangular frame 2 and is resiliently held by the same through a plurality of metal hooks 3a. That is, the sheet 4 is formed at each side thereof with a folded-back portion or sleeve portion 4a through which a steel rod 3 is inserted. Axial ends of the steel rod 3 are left free. The rectangular flexible sheet 4 is arranged within the rectangular frame 2 having the steel rods 3 faced toward opposed side portions of the frame 2 respectively. The steel rods 3 and the side portions of the frame 2 are connected through the hooks 3a, each having one curved end hooked to the corresponding steel rod 3 and the other curved end hooked to the corresponding side porition of the frame 2. More specifically, the other curved ends of tghe hooks 3a are hooked to openings (no numerals) formed in the frame 2. With this arrangement, the flexible sheet 4 is resiliently expanded within the rectangular frame 4. A generally rectangular plastic panel 5 is mounted on the expanded flexible sheet 4. Preferably, the panel 5 is made of a thermoplastic resin having a suitable resiliency. Mounted on the panel 5 is a cushion structure 8 which is of a layered article comprising a pad material 6 and an outer layer member 7. The pad material 6 is constructed of foamed polyurethane, foamed rubber or the like. The outer layer member 7 comprises a backing material 7a, a wadding 7b and an outer skin 7c.

In accordance with the present invention, the following measures are further employed.

That is, the pad material 6 is molded to have a convex structure having side portions raised as is seen from FIG. 1. For neatly supporting thereon the convex pad material 6, the plastic panel 5 is also formed convex having side portions 5b raised. An integral side wall 5a extends downwardly from the leading end of each raised side portion 5b of the plastic panel 5. That is, as shown, the side wall 5a extends outside the corresponding side portion of the frame 2 and has a lower end portion bent inwardly, that is, toward the frame 2. Thus, a considerable clearance of generally triangular cross section is defined below each side of the plastic panel 5, which is bounded by the raised side portion 5b, the upper part of the side wall 5a and an imagninary plane which includes the expanded flexible sheet 4.

Two wedge-shaped air bags 10 are respectively received in the clearances which are thus provided at the lateral sides of the plastic panel 5. The air bags 10 are constructed of plastic film, rubber or the like. In order to fix the shape of the bag 10 under expansion, the bag 10 may be jacketed with a reinforcing cloth 10a. Designated by numerals 10b are double-faced adhesive members by which the air bag 10 is affixed to the plastic panel 5 and the expanded flexible sheet 4.

As in seen from FIG. 1, the outer skin 7c of the outer layer member 7 extends downward in a manner to cover the downwardly extending side wall 5a of the plastic panel 5. The lower end portion of the outer skin 7c is folded back and fixed to the lower end of the panel side wall 5a by means of retainers 9a. Designated by numeral 9b ar other retainers by which a given portion of the cushion structure 8 is fixed to the raised side portion 5b of the plastic panel 5. Due to presence of the downwardly extending part of the outer skin 7c which conceals the unsightly parts, the external view of the seat cushion 1 is improved.

Figure 3:
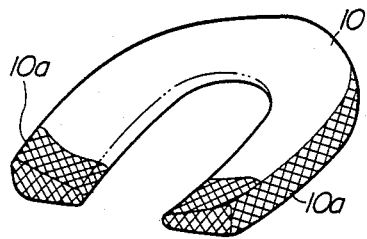
FIG. 3 is a perspective view of another air bag employable in the first embodiment.

If desired, as is shown in FIG. 3, a generally U-shaped air bag 10 may be used in place of the above-mentioned two air bags 10. In this modification, the pad material 6 and the plastic panel 5 are molded to have generally U-shaped recesses respectively for accommodating the air bag 10. Furthermore, a doughnut-like air bag is also usable.

Figure 4:
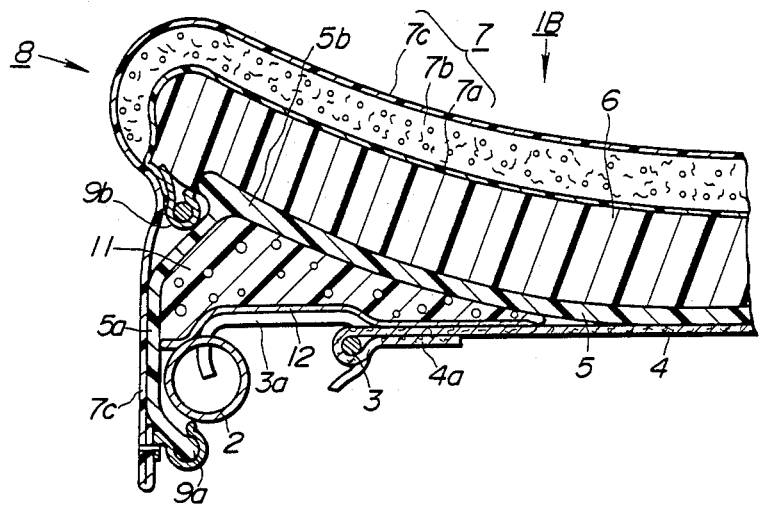
FIG. 4 is a view similar to FIG. 1, but showing a second embodiment of the present invention.

Referring to FIG. 4, there is shown a second embodiment of the present invention. In the seat cushion 1B of this embodiment, foamed plastic members 11, such as polyurethane foam or the like, are used in place of the above-mentioned air bags 10. That is, the foamed plastic members 11 are received in the clearances which are provided at the lateral sides of the plastic panel 5. As shown, each foamed plastic member 11 is bonded to the plastic panel 5 and seated on a supporting plate 12 which is mounted on the frame 2, the hooks 3a and the side portion of the expanded flexible sheet 4.

Figure 5:
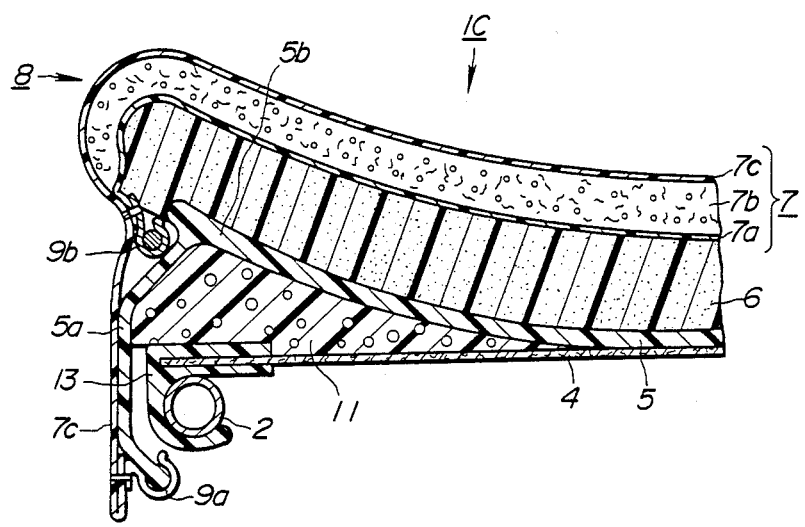
FIG. 5 is a view similar to FIG. 1, but showing a third embodiment of the present invention.

Referring to FIG. 5, there is shown a third embodiment of the present invention. The seat cushion 1C of this embodiment is substantially the same as that of the second embodiment except that in the third embodiment, plastic holders 13 are employed in place of the above-mentioned hooks 3a for connecting the flexible sheet 4 to the frame 2. That is, the plastic holders 13 are integrally connected to the sheet 4 and hooked to the frame 2, and the foamed plastic member 11 is seated on the side portion of the sheet 4.

Figure 6:
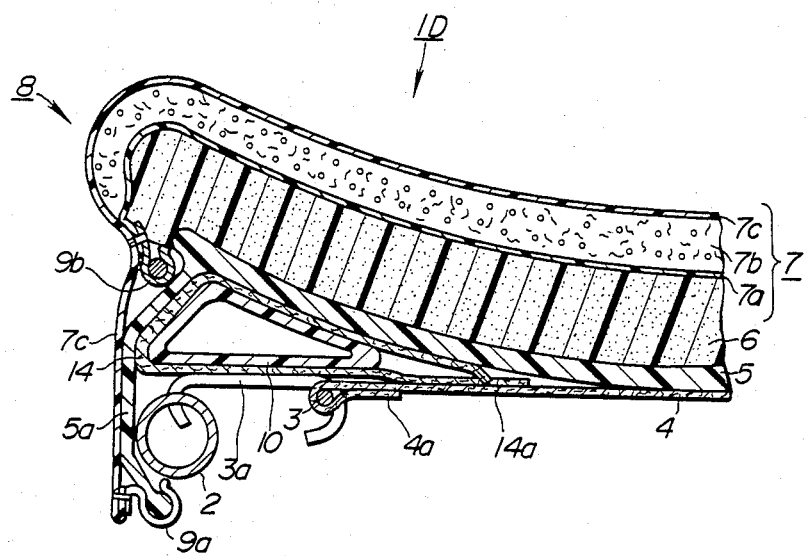
FIG. 6 is a view also similar to FIG. 1, but showing a fourth embodiment of the present invention.
Figure 7:
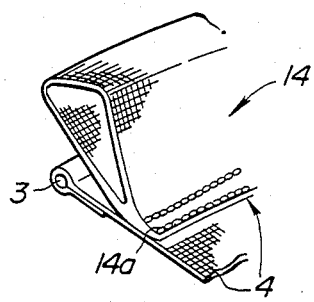
FIG. 7 is a perspective view of a part of a sleeve member employed in the fourth embodiment.

Referring t6o FIGS. 6 and 7, there is shown a fourth embodiment of the present invention. The seat cushion 1D of this embodiment is substantially the same as the seat cushion 1A of the first embodiment of FIG. 1 except that in the fourth embodiment, a sleeve 14 made of flexible woven cloth, flexible plastic sheet or the like is employed, which holds therein the air bag 10. As is seen from FIG. 7, the sleeve 14 is stitched to the flexible sheet 4. In this fourth embodiment, undesired slippage and dislocation of the air bag 10 are assuredly prevented due to the provision of the sleeve 14.

If desired, the following modifications are employable in the present invention.

The downwardly extending part of the outer skin 7c may be removed. In this case, the outer surface of the downwardly extending side wall 5a of the plastic panel 5 is lined with a suitable layer which has an external view similar to the outer layer member 7.

A separate panel may be used as a substitute for the downwardly extending part 5a of the plastic panel 5. Of cource, in this case, the separate panel is fixed to the plastic panel 5 through suitable connectors.

In the following, advantages of the present invention will be described.

First, in the present invention, an air bag 10 or foamed plastic member 11, which can have a fixed confgulation and a uniformed size, is used for providing the seat cushion with raised side portions. Thus, the raised side portions formed on the seat cushion can be balanced in configulation and size. This provides not only improvement in extenal view of the seat cushion but also improvement in occupant holding performance.

Second, since the air bag 10 and the foamed plastic member 11 are of a single unit, putting them into the given clearances of the seat cushion structure can be easily achieved without employment of skilled labor and time.

Third, since the cushion structure 8 including the pad material 6 and the outer layer member 7 has a generally even thickness therethroughout, formation of the same can be easily carried out.

Fourth, since the downwardly extending part of the outer skin 7c of the outer layer member 7 is fixed at vertically spaced two portions thereof to the side wall 5a of the plastic panel 5, the outer skin 7c is prevented from producing unsightly creases or wrinkles thereon even when the seat cushion bears a seat occupant.

What is claimed is:

1. A seat cushion comprising:
   a rectangularly extending frame having opposed side portions;
   a flat sheet member arranged within a space defined by the rectangular frame;
   means for connecting each side portion of said flat sheet member to one of said opposed side portions of the frame;
   a plastic panel member having side portions raised, said plastic member being disposed on said flat sheet member leaving between each of the raised side portions and corresponding one of the opposed side portions of said frame a generally wedge-shaped clearance;
   a cushion structure tightly mounted on said plastic panel in such a manner that side portions of said cushion structure are raised by said raised side portions of the plastic panel; and
   two cushion pad units respectively received in the wedge-shaped clearances defined below the raised side portions of the plastic panel member.

2. A seat cushion as claimed in claim 1, in which each of said cushion pad units is of a resiliently deformable member which is shaped to match with the shape of the corresponding one of said wedge-shaped clearances.

3. A seat cushion comprising:
   a rectangularly extending frame having opposed side portions;
   a flat sheet member arranged within a space defined by the rectangular frame;
   means for connecting each side portion of said flat sheet member to one of said opposed side portions of the frame;

a plastic panel member having side portions raised, said plastic member begin disposed on said flat sheet member leaving between each of the raised side portions and correspondingly one of the opposed side portions of said frame a generally wedge-shaped clearance;

a cushion structure tightly mounted on said plastic panel in such a manner that side portions of said cushion structure are raised by said raised side portions of the plastic panel; and two cushion pad units respectively received in the wedge-shaped clearances defined below the raised side portions of the plastic panel member, wherein each of said cushion pad units is of a resiliently deformable member which is shaped to match with the shape of the corresponding one of said wedge-shaped clearances and each of the raised side portions of said plastic panel member is integrally formed with a side wall which extends downward in a manner to conceal both the corresponding cushion pad unit and the corresponding side portion of the frame.

4. A seat cushion as claimed in claim 3, in which said cushion pad units are of an air bag.

5. A seat cushion as claimed in claim 3, in which said cushion pad units are of a foamed plastic member.

6. A seat cushion as claimed in claim 3, in which said flat sheet member is constructed of a flexible material and expanded entirely by said connecting means.

7. A seat cushion as claimed in claim 6, in which said connecting means comprises a plurality of hooks each having one curved end connected to each side portion of said flat sheet member and the other curved end hooked to corresponding one of the opposed side portions of said frame.

8. A seat cushion as claimed in claim 7, in which each side portion of said flat sheet ember is formed with a folded-back portion through which a steel rod is inserted, and in which the one curved end of each of said hooks is hooked to said steel rod.

9. A seat cushion as claimed in claim 8, in which the other curved end of each of said hooks is hooked to an opening formed in said frame.

10. A seat cushion as claimed in claim 9, in which said cushion structure is of a layered article which comprises a pad material and an outer layer member.

11. A seat cushion as claimed in claim 10, in which said outer layer member includes an outer skin having an extension which covers the outer surface of the side wall of said plastic panel member.

12. A seat cushion as claimed in claim 4, further comprising a sleeve member is held in each of said wedge-shaped clearances to hold therein the corresponding one of said air bags.

13. A seat cushion as claimed in claim 12, in which said sleeve member is stitched to said flat sheet member.

14. A seat cushion as claimed in claim 7, further comprising a supporting plate which is mounted on said hooks to support thereon each of said cushion pad unit.

15. A seat cushion as claimed in claim 5, in which said connecting means comprises a plastic holder which has one end integrally connected to said flat sheet member and the other end hooked to the corresponding side portion of said frame.

* * * * *